$Pr = Ps/Pm \times 100\%$

United States Patent Office 3,317,705
Patented May 2, 1967

3,317,705
METHOD OF AND APPARATUS FOR CONTROLLING THE POROSITY OF ELECTRICALLY SINTERED BODIES
Kiyoshi Inoue, 182 3-chome, Tamagawayoga-machi, Setagaya-ku, Tokyo, Japan
Filed Nov. 29, 1963, Ser. No. 326,837
Claims priority, application, Japan, Dec. 26, 1961, 36/47,409; Dec. 29, 1961, 36/48,028; Jan. 16, 1962, 37/1,356; Jan. 20, 1962, 37/1,982; Jan. 29, 1962, 37/3,123; Feb. 7, 1962, 37/4,652, 37/4,653; April 25, 1962, 37/16,930; May 1, 1962, 37/17,982; May 8, 1962, 37/18,546; May 30, 1962, 37/21,567; June 4, 1962, 37/22,767; June 7, 1962, 37/22,877; Sept. 19, 1962, 37/40,684; Oct. 9, 1962, 37/43,542; Nov. 30, 1962, 37/52,669; May 30, 1963, 38/28,052
14 Claims. (Cl. 219—149)

ABSTRACT OF THE DISCLOSURE

This disclosure is directed to methods and apparatus for controlling the porosity and density of sintered-particles bodies in which the sintering pressure and energy is derived at least in part from an impulsive spark discharge through the mass across which an alternate current is applied to regulate the density of the body and/or facilitate the discharge.

My present invention relates to the electric-discharge sintering of particles and, more particularly, to a method of and an apparatus for controlling the porosity of such bodies.

This application is a continuation-in-part of my copending applications Ser. Nos. 247,387 and 319,821, filed Dec. 26, 1962 and Oct. 29, 1963, and now U.S. Patents 3,250,892 and 3,241,956, issued May 10, 1966 and March 22, 1966, respectively. In said copending applications I disclose methods of sintering discrete particles of conductive materials, with or without admixture of other particulate substances, which constitute a considerable improvement over earlier-known sintering techniques requiring the use of gas furnaces and inductive or dielectric heating. In these prior-art techniques, it was generally necessary to subject the mass of particles to extremely high pressures, usually on the order of several tons per cm.$^2$, jointly with an elevation of the temperature of the particle to a fusion point just below the melting point of the particles to effect a welding together of the particles. It had also been proposed prior to the methods described in the aforementioned copending applications, to employ resistance-heating techniques and to make use of adhesives or fusion-promoting agents which permit the use of lower temperatures.

In my copending applications described above, of which the present application is a continuation-in-part, I disclose and claim a method of sintering discrete electrically conductive particles and even certain nonconductive bodies admixed with the conductive particles wherein the mass of particles is disposed in relatively light-contacting relationship under a low mechanical pressure generally less than 100 kg./cm.$^2$ and even as low as the pressure produced by the piling of the particles, and effecting an impulsive space discharge within the mass so that, advantageously, an electric spark develops between adjacent bodies. Surprisingly, the impulsive character of the spark discharge has been found to produce both the elevated temperatures required for interfacial fusion and particle-to-particle pressures in excess of the mechanically applied pressure and sufficient, in combination with the elevated temperatures, to sinter the particles together.

The spark jumping between adjacent particles and the impulsive discharge created in the space occupied thereby apparently effects some degree of erosion of material at the sparking locations and an ionization of such eroded material to permit a diffusion of material from one particle into the lattice structure of the other particle. Studies have indicated that, after an initial fusion resulting from the spark discharge, the interparticle weld is strengthened by the passage of electric current through the mass of particles in which the adjacent particles are connected by fusion bridges produced over limited zones by the spark discharge. The resulting resistive or joule heat is, of course, concentrated at the fusion bridges with an increase in the temperature thereof to the fusion point whereby the initially limited zones of fusion are broadened.

It may be emphasized that an essential feature of this novel technique resides in the maintenance of only a relatively light contacting relationship between the particles to enable the development of spark discharge. In general terms, it may be noted that the fusion bridges are best produced when the interfacial or particle-to-particles contact resistance is greater than or on the order of the internal resistance of the particle so that an electrical breakdown tends to take place between the particles. In my second application on this subject Ser. No. 319,821, filed Oct. 29, 1963, (U.S. Patent No. 3,241,956 of March 22, 1966), I disclose techniques for producing sintered bodies of relatively high density as compared with the basic method described generally above. Apparently, the conductive bridges initially formed between the particles prevent, to a large degree, a contraction of the mass during the subsequent resistive-heating stage so that the porosity of the body produced in accordance with the earlier technique was relatively high. As pointed out in the subsequent copending application, it has been found to be possible to increase the density of the sintered bodies produced by electrical spark discharge when the relatively low mechanical pressure established during the initial spark-discharge fusion is strongly augmented concurrently with or subsequently to the termination of spark discharge; the initial mechanical pressure, which can range between 0.1 kg./cm$^2$ and 5 kg./cm$^2$ but can be as low as the pressure resulting from piling of the particles, thus gives rise to an elevated mechanical pressure between substantially 6 kg./cm$^2$ and 1000 kg./cm$^2$. Apparently the pressure increase takes place while the conductive bridges of the particles are in a heated or plastically deformable condition so that the particles are pressed closer together and the density of the sintered body markedly increased. It has been found that densities approaching 99% of the density of the solid metal can be obtained in this manner. In this latter copending application, I also point out that improved results are obtained when the applied power is markedly reduced or terminated one or more times during the spark-discharge step while conductive bridges are being formed. Moreover, it was shown that highly effective results could be obtained when the power applied to the mass has a direct-current or low-frequency component in combination with a high-frequency alternating-current component, the spark-discharge being effected primarily via the discharge of capacitive means across the sintering electrodes from a direct-current source.

It is the principal object of the present invention to provide a method of and apparatus for extending the principles disclosed in the aforementioned copending application and affording the possibility of controlling the porosity or density of a sintered body produced by spark-discharge fusion within a substantially continuous range.

I have now found that the porosity of bodies produced by inter-particle fusion via spark discharge is determined by several factors which can easily be controlled to yield bodies of varying densities without modifying the pressure applied to the bodies although, as described in my application Ser. No. 319,821 (U.S. Patent No. 3,241,956), the applied pressure can be augmented at termination of spark discharge. More specifically, it has been discovered that, for a given power consumption and intensity, the density of a sintered body composed substantially of particles of any metal varies nonlinearly with the duration of current flow through the mass within a period ranging from, say, 0.1 to 30 seconds, the rate of increase of density with time then falling off sharply. At lower power intensities, however, reduced densities are observed. It is, therefore, an important feature of the present invention to provide a method of controlling the porosity of a sintered body wherein an impulsive spark discharge is developed in a mass of the particles, which comprises the steps of controlling one of the parameters of this sintering stage, e.g. by adjusting the period of current flow to a level corresponding to that at which the desired particle density will be obtained.

According to another feature of this invention, it is possible to control the porosity and density of the sintered body by varying the discharge power or intensity. As previously indicated, for any given period of time, particle size and particle composition, the density of the sintered body at constant mechanically applied or static pressure will vary with the intensity or power of the impulsive discharge. Moreover, I have discovered that when particle sizes up to about 0.1 mm. and ranging upwardly from about 0.2 micron are used, there is a definite relationship between the particle size and the sintered-body density for metallic particles with constant static pressure, power and treatment period. Thus it is possible to assign a given set of processing parameters to the body to be produced and modify the density of the desired body by varying either the treatment time, the particle size or the spark power.

Furthermore, it has surprisingly been discovered that the density of a sintered body produced in accordance with the present technique can be selected within a well-defined range by a choice of the electrical parameters used. Thus, for a given spark intensity, treatment time, particle size and externally applied pressure, it has been observed that the density of the sintered body increases with increasing frequency of a relatively low-frequency alternating current ranging between 100 cycles/sec. and 10 kc./sec. although comparable intensities of direct current will give greater sinter densities at least over the desirable processing ranges. By superimposing alternating current in the indicated range of frequencies upon direct current, in varying proportions, it is possible to regulate the density by selecting relative alternating-current and direct-current powers corresponding to the desired density.

The above and other objects, features and advantages of the present invention will become more readily apparent from the following description, reference being made to the accompanying drawing in which.

Figure 1:
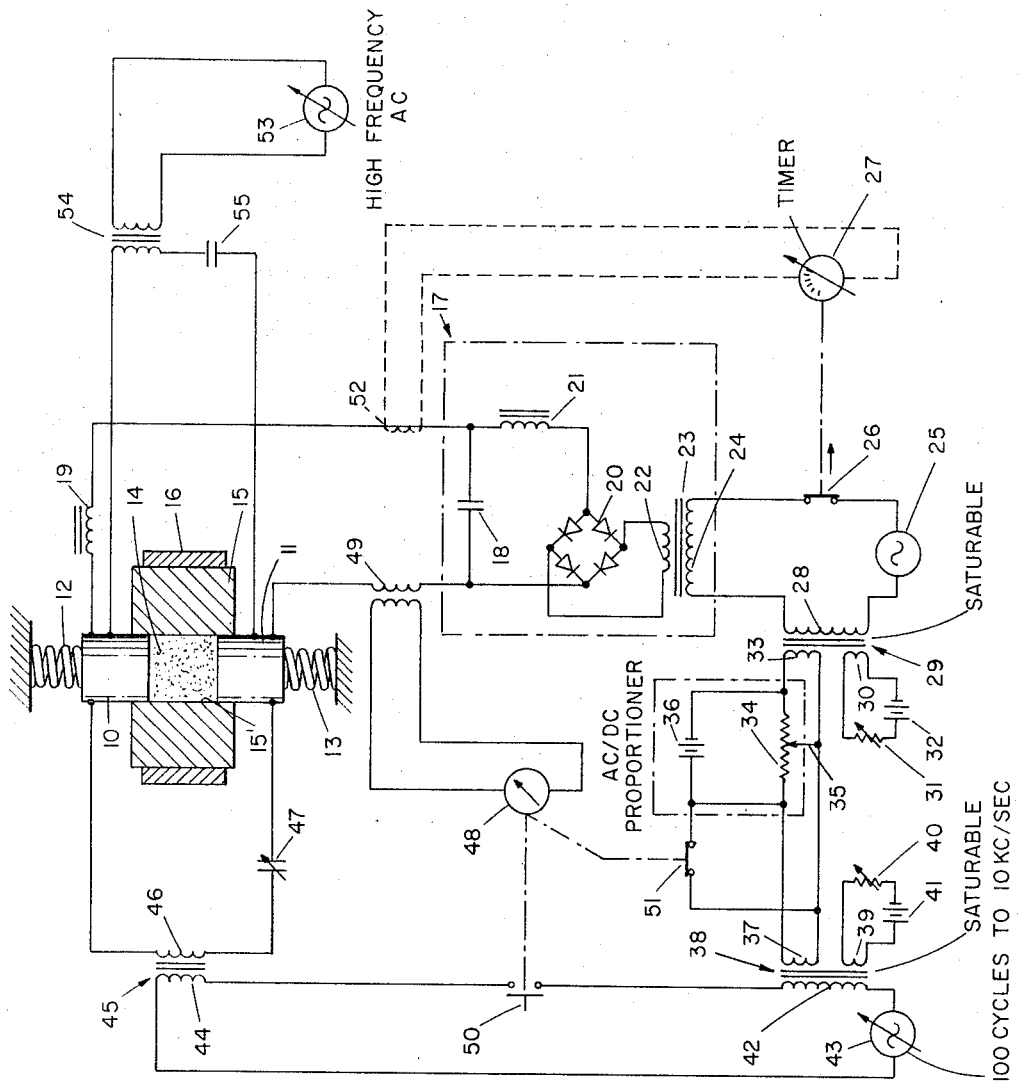
FIG. 1 is a diagrammatic axial cross-sectional view through an apparatus for sintering particles by spark discharge with the electrical circuit means therefor illustrated schematically.

In FIG. 1, I show a sintering apparatus which is generally similar to those illustrated in my copending application 247,387 (U.S. Patent No. 2,250,892) and comprises a pair of electrodes 10, 11 biased by respective springs 12 and 13 to lightly compact a mass 14 of particles to be sintered. The mass is retained in a heat-resistant separable die 15 held in place by a strap 16. The spark-sintering power supply 17 for the apparatus can include a spark-discharge capacitor 18 connected across the electrodes 10 and 11 in series with a pulse-shaping inductance 19, the capacitor 18 being charged by a rectifier bridge 20 through another inductance 21 by means of the secondary winding 22 of a power transformer 23 whose primary winding 24 is energized by an alternating-current source 25 in series with a normally closed and manually operable switch 26 adapted to be opened after an adjustable time interval by a timer 27.

The power winding 28 of a saturable-core reactor 29 is connected in series with primary 24 of transformer 23 and has its biasing winding 30 in circuit with a variable resistor 31 and a bias battery 32. The control winding 33 of the saturable reactor 29 is connected to one terminal of a voltage-dividing potentiometer 34 and to the slider 35 thereof. The voltage-dividing potentiometer 34 forms, with a direct-current source 36, an alternating-current/direct-current proportioner which permits selection of the relative amounts of alternating-current and direct-current power supplied to the electrodes 10, 11. To this end, the control winding 37 of another saturable core reactor 38 is connected to the other fixed terminal of potentiometer 34 and to the slider 35. The biasing winding 39 of reactor 38 is tied to a variable resistor 40 in series with a bias battery 41. The primary winding 42 of saturable reactor 38 is connected in series with a variable-frequency, alternating-current source 43 (e.g. a variable-frequency oscillator) and the primary winding 44 of a power transformer 45 whose secondary winding 46 is bridged across the electrodes 10, 11, via a tuning capacitor 47.

A current-indicating meter 48 is energized by a current transformer 49 connected in energizing circuit across the electrodes 10, 11 in series with rectifier bridge 20. Meter 48 controls a switch 50 in series with primary winding 44 and power winding 42 of the reactor 38 as well as a further switch 51 adapted to cut out the slider 35 of potentiometer 34 when maximum power is desired during spark discharge. When it is desired to use the alternating current superimposed upon the direct current even during the initial formations of conductive bridges between the particles, i.e. in the first fractions of a second of a discharge sintering process, switch 51 remains open and is decoupled from the current-responsive means 48. The use of the apparatus for several modes of operation will be described hereinafter.

After the conductive powdered mass 14 is disposed within the die cavity 15' of die 15, electrodes 10 and 11 are brought to bear against the particle mass relatively lightly (e.g. with a pressure between 0.1 and 5 kg./cm.²) so that these electrodes can follow the particle mass and maintain contact therewith even upon shrinkage of the mass. In one mode of operation, the current-responsive meter 48 is set to open switch 51 and close switch 50 upon the attainment of a predetermined elevated current supplied by the discharge source 17 across the electrodes 10, 11, such current increase arising upon the formation of conductive bridges between the electrodes of such nature as to reduce the overall electrical resistance of the mass 14. Potentiometer 35 is set in such manner as to adjust the relative biases applied to control windings 33 and 37 of saturable reactors 29 and 38 to levels corresponding to the relative proportions of alternating and direct current which it is desired to apply to the mass of particles. It will be evident that movement of the slider to the right will increase the amount of the alternating-current power relative to direct-current power and vice-versa. Switch 26 is then closed and spark discharge develops across the electrodes 10, 11 with each discharge of capacitor 18, the space discharge between these electrodes producing conductive bridges between adjacent particles. With the formation of conductive bridges throughout the mass, an occurrence requiring periods on the order of one second or fractions thereof, the current flow through the mass from rectifier bridge 20 increases sharply to energize the current-responsive element 48 and close switch 50. An alternating current having a frequency between substantially 100 cycles/second and 10 kilocycles/second is then applied to the electrodes 10 and 11, this frequency being determined by the manual setting of variable-frequency source 43 and tuning capacitor 47, the A.C. power being proportioned to the D.C. power in accordance with the adjustment of slider 35.

In the mode of operation in which this alternating current is supplied together with the initiation of spark discharge, the current-responsive device 48 is disconnected and switch 50 manually closed simultaneously with operation of switch 50 manually closed simultaneously with operation of switch 26, switch 51 being opened. When it is desired to operate the alternating current means subsequent to the spark discharge formation of conductive bridges, current-responsive meter 48 remains in circuit with the current transformer 49 and switches 50 and 51 are employed. Switch 51 insures that the full power of D.C. source 20, at a level determined by the setting of variable resistor 31, will be applied across the electrodes 10 and 11 without modification by the setting of potentiometer 35. The timer 27 is provided to open switch 26 upon termination of the processing together with switch 50 or alone if it is desired to terminate direct-current flow prior to the termination of alternating-current flow. Timer 27 may also be constituted as a current-responsive element connected in circuit with source 20 and electrodes 10, 11 via current transformer 52 for terminating D.C. current flow when the current reaches a predetermined value inductive of complete formation of conductive bridges between the adjacent particles.

In the manner described in my copending application Ser. No. 319,821 (U.S. Patent 3,241,956) a high-frequency source 53 having an adjustable range between substantially 0.1 and 100 megacycles/second can be inductively coupled, via a transformer 54 and a direct current-blocking capacitor 55 across the electrodes. It must be noted that the apparatus can also include the means disclosed in this latter application for increasing the pressure applied to the particle mass at the termination of current flow therethrough as well as means for reducing the D.C. current passed through the mass at least once during operation subsequent to the formation of conductive bridges and prior to termination of current flow.

Figure 2:
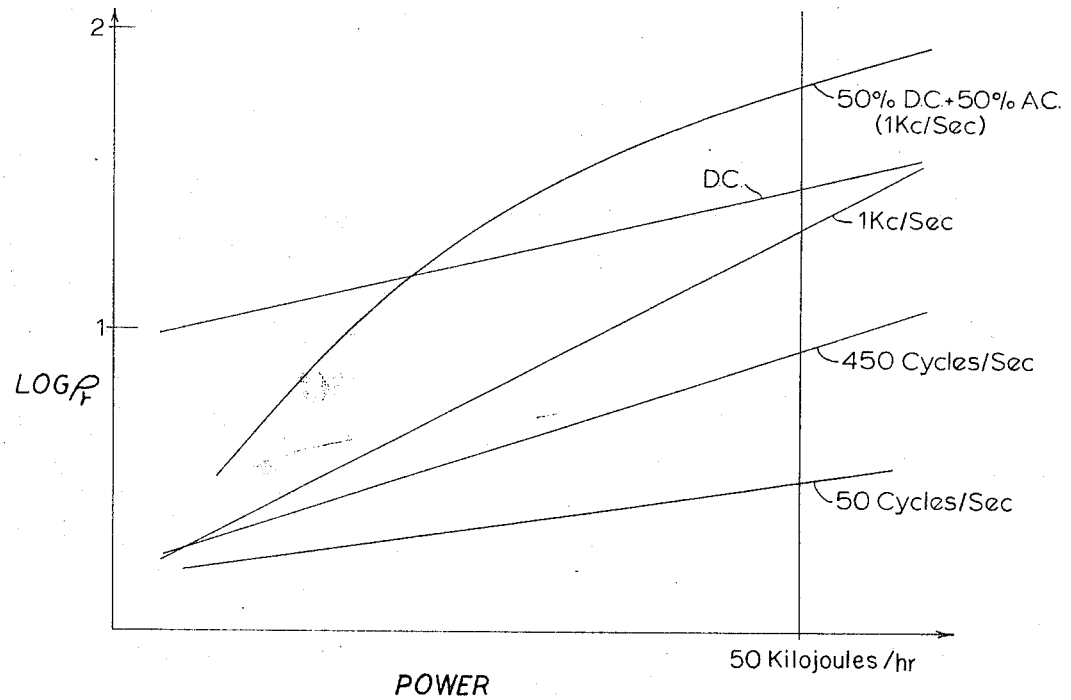
FIG. 2 is a graph of the relationship between the logarithm of the density ratio $\rho_r$ and power for sintering processes carried out with varying amounts of alternating current applied across the electrodes and varying alternating-current frequencies.
Figure 3:
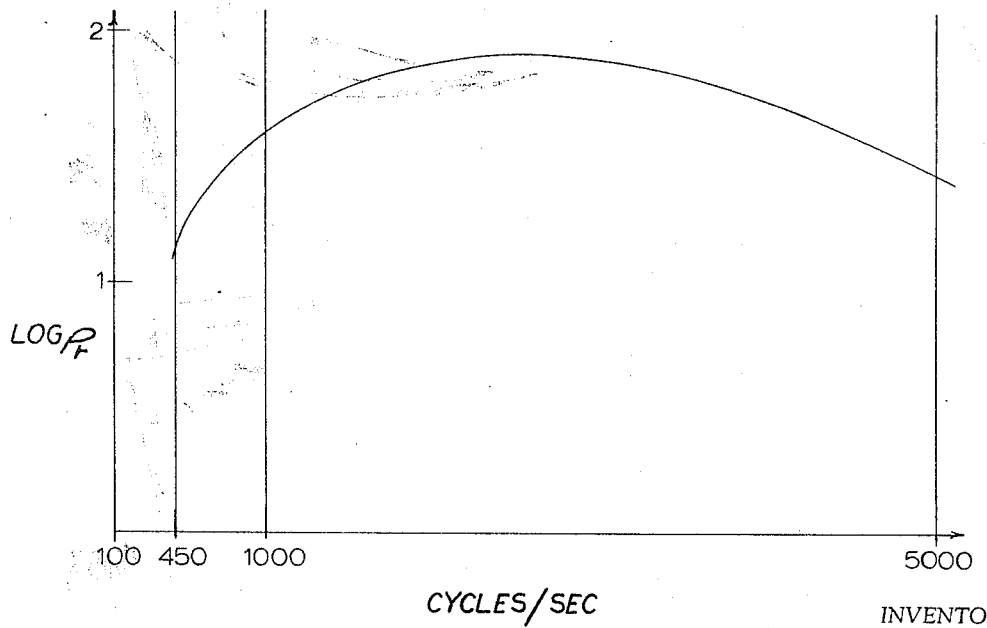
FIG. 3 is a graph of the logarithm of the density ratio with frequency for various sintering powers.

In FIG. 2 I show a graph wherein the log of the density ratio $\rho_r$ is plotted against the electric power supplied to the particle mass for currents of varying frequency and for an alternating current superimposed upon direct current. From both FIGS. 2 and 3 it will be evident that, in the absence of direct current, the density ratio $\rho_r$ which is the ratio of the density $\rho_s$ of the sintered mass to the density $\rho_m$ of the solid metal, given in percent for convenience, increases with increasing power for all frequencies and direct current, but that the sharpest increase of density with power is obtained when alternating current is superimposed upon direct current. Surprisingly, the use of direct current in the absence of alternating current provides better results over a significant part of the power range than do alternating currents, but alternating currents of higher frequency operate with significantly better results up to about 1 kilocycle/second. Frequencies much above 10 kilocycles/second result in a noticeable lowering of the power efficiency in terms of the density ratio.

Figure 4:
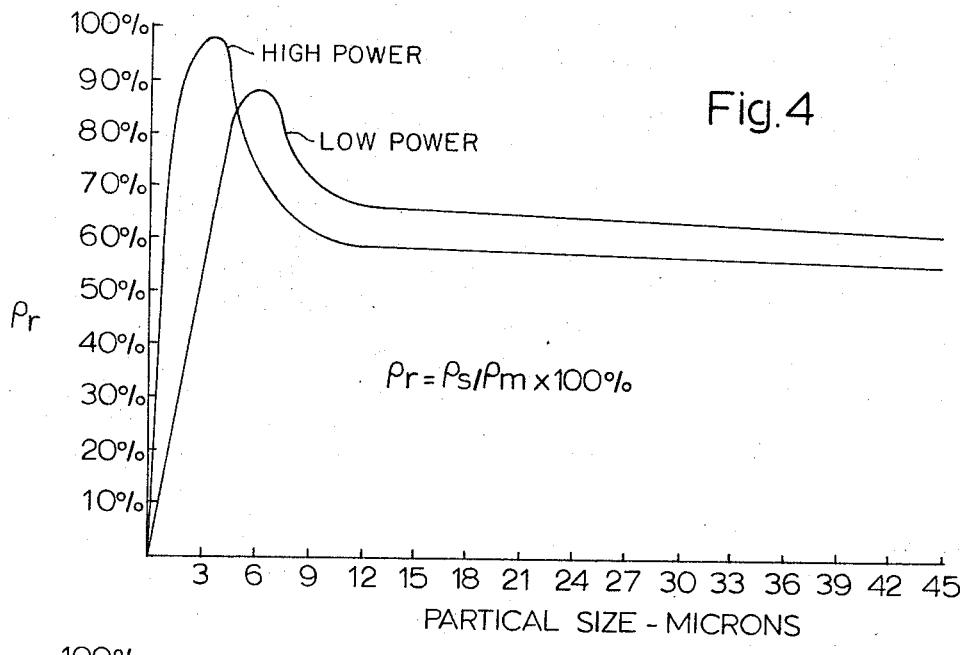
FIG. 4 is a graph of the density ratio plotted against particle sizes at different powers.

FIG. 2 also provides an indication of the relative efficiencies of different frequencies superimposed upon direct current in a ratio of 50% alternating current power to 50% direct current power. It is evident, therefore, that it is possible to determine the relationship between frequency of superimposed alternating current and the density ratio and/or the relationship between the relative proportions of alternating current and direct current powers and the density ratio. The proper proportion of A.C./D.C. power and/or frequency of superimposed alternating current can then be selected by adjustment of slider 35 and variable-frequency source 43 with adjustment of tuning capacitor 47 to yield sintered bodies of any desired density up to substantially 99% of the density of the solid metal. In FIG. 4 I show the relationship between the density ratio and particle size. From similar characteristic curves for any material at any given power it is possible to select that particle size which would yield the desired density. It should be noted that the characteristic of particle size with respect to density ratio has a peak at small particle sizes and then tends to level off. I have found that the characteristic is more or less smooth until particle sizes of 0.1 mm. are reached at which point the characteristic has an undulated appearance. For the most part it can be said that, for substantially all meters, there is no sharp change in the particle-size characteristics between about 4 microns and 0.1 mm. so that mixtures of particle sizes within this range can be used conveniently. It is possible to obtain density ratios above that of the 16–70% range at which the illustrated characteristics level off by superimposition of alternating current upon direct current as previously described with or without the elevation of pressure called for in my application Ser. No. 319,821 (U.S. Patent 3,241,956).

Figure 5:
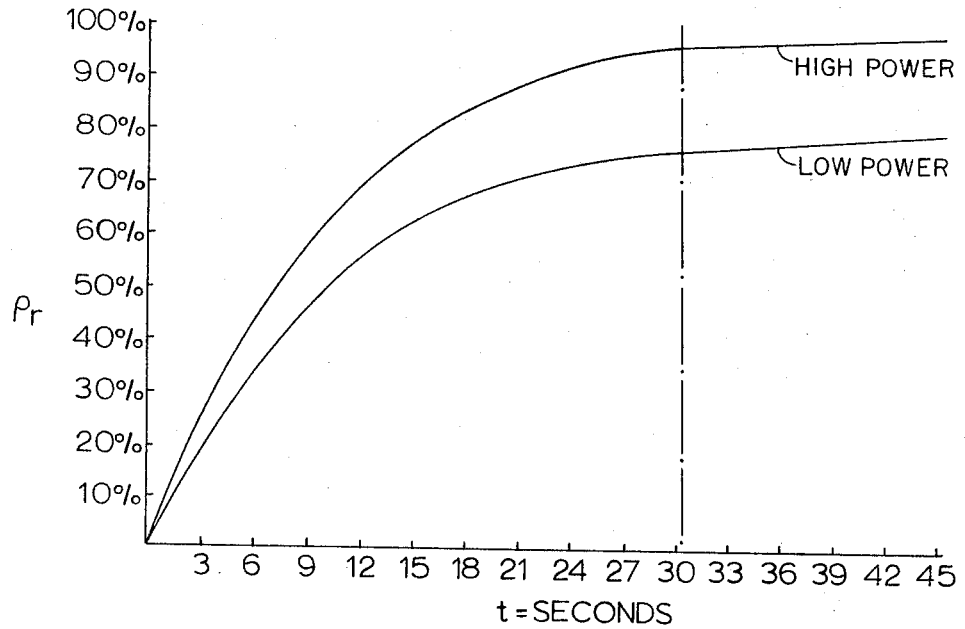
FIG. 5 is a graph of the density ratio plotted against sintering time for different sintering powers.

In FIG. 5 I show a density ratio plotted against processing time in seconds for various powers. From these characteristics it can be seen that the density rises nonlinearly during the first 30 seconds of treatment and then levels off thereafter while continuing to rise slightly. It follows that the most economical processing period is less than 30 seconds, this period affording a maximum of controllability with regard to density ratio. It is thus possible to determine the time characteristic of density ratio for a particular material and then select a time period accordingly by setting timer 27 to obtain the desired density of the sintered body.

*Example I*

A nickel disk, having a diameter of 50 mm. and a thickness of 5 mm., is produced from nickel powder having a particle size of 2 microns by disposing the powder between the electrodes 10 and 11 (FIG. 1) with a mechanically applied pressure of 150 gr./cm.² A power of 50 joules/spark is employed for a total processing time of 15 seconds with a potential of 3 volts across the electrodes. The alternating-current power (1 kc./sec.) was 60% of the total power while the D.C. power was 40%. The resulting body had a specific gravity or density of 7. In this case, the density ratio of $\rho_r$ was 78.6%.

*Example II*

The process of Example I was followed except that the A.C. power was 10% of total power and the D.C. power 90% of total power. Again an alternating current of a frequency of 1 kc./sec. was used with 2 micron nickel powder and a total power of 50 joules/hr. for the processing time of 15 seconds. The mechanically applied pressure was 50 gr./cm.². The density of the resulting body, which had the dimensions of those given in Example I, was 4.5, i.e. a density ratio $\rho_r$ of 50.5%.

*Example III*

The process of Example I was followed with all parameters identical except that the processing time was 30 seconds instead of 15 seconds. The specific gravity of the sintered body was then found to be 8.3 gr./cm.³ with a density ratio $\rho_r$ of about 94%.

*Example IV*

The steps and parameters of Example I were used except that the frequency of the alternating current was 450 cycles/sec. The sintered body had a density of about 6.2 for a density ratio $\rho_r$ of about 70%.

*Example V*

The method of Example I was followed except that a high-frequency field (1 megacycle/sec.) was applied across the electrode and a pressure of 500 kg./cm.² was applied for several seconds at power cutoff after 15 seconds. The sintered body had a density in excess of 99% of that of the solid metal.

*Example VI*

The method of Example I was used in several tests wherein all the parameters were maintained as given in this example except for the particle size which was increased successively to 3 microns, 10 microns, 50 microns and 0.1 mm. The increase of the particle size from 2 microns to 3 microns resulted in a decrease in the density ratio $\rho_r$ by about 12%, the further increase to 10 microns producing no noticeable change from the value at 3 microns. The body formed from particles of 50 microns particle size had a density ratio diminished by approximately 15% of the density ratio resulting from sintering particles of 2 microns, there being no further noticeable diminution with the particles of 0.1 mm. All particle sizes were mean or averages although efforts were made to maintain homogeneity. It was observed that there was a substantially logarithmic increase in the hardness of the body, as measured with a Vickers hardness-testing machine, with increasing particle size.

*Example VII*

The method of Example I was used with the parameters given except that a spark energy of 75 joules/spark was employed. The density ratio $\rho_r$ was then raised to 88.4% in the 15 second-processing time. When a 30-second period was employed, the density of the body was brought to 97% of the density of the solid metal.

The invention as described and illustrated is believed to admit of many modifications and variations within the ability of persons skilled in the art, all such modifications and variations being deemed to be included within the spirit and scope of the appended claims.

I claim:
1. A method of sintering discrete electrically conductive particles into a coherent body, comprising the steps of:
   disposing said particles in a mass between a pair of electrodes;
   applying to said mass a light pressure sufficient to ensure development of a spark discharge between adjacent particles upon application of an electric field between said electrodes;
   effecting an impulsive spark discharge through said mass to form fusion bridges between adjacent particles and continuing the passage of a unidirectional electric current through said mass after initial formation of said bridges;
   superimposing upon said unidirectional current an alternating current having a frequency ranging between substantially 100 cycles/sec. and 10 kc./sec; and
   selecting the frequency of said alternating current in accordance with the desired density of said body.

2. A method of sintering discrete electrically conductive particles into a coherent body, comprising the steps of:
   disposing said particles in a mass between a pair of electrodes;
   applying to said mass a light pressure sufficient to ensure development of a spark discharge between adjacent particles upon application of an electric field between said electrodes;
   effecting an impulsive spark discharge through said mass to form fusion bridges between adjacent particles, while superimposing upon a unidirectional current a periodic current having a frequency ranging between substantially 100 cycles/sec. and 10 kc./sec. and continuing the passage of a unidirectional electric current through said mass after initial formation of said bridges; and
   selecting the ratio of the power of said periodic current and the power of said unidirectional current in accordance with the desired density of said body.

3. A method of sintering discrete particles of an electrically conductive material into a coherent body, comprising the steps of:
   selecting particles of said material of a particle size determined by the desired density of said body;
   disposing the selected particles in a mass between a pair of electrodes;
   applying to said mass a light pressure sufficient to ensure development of a spark discharge between adjacent particles upon application of an electric field between said electrodes;
   effecting an impulsive spark discharge through said mass to form fusion bridges between adjacent particles, while superimposing upon a unidirectional current a periodic current having a frequency ranging between substantially 100 cycles/sec. and 10 kc./sec., and continuing the passage of a unidirectional electric current through said mass after initial formation of said bridges; and
   selecting the frequency of said periodic current in accordance with the desired density of said body.

4. A method of sintering discrete particles of an electrically conductive material into a coherent body, comprising the steps of:
   selecting particles of said material of a particle size determined by the desired density of said body;
   disposing the selected particles in a mass between a pair of electrodes;
   applying to said mass a light pressure sufficient to ensure development of a spark discharge between adjacent particles upon application of an electric field between said electrodes;
   effecting an impulsive spark discharge through said mass to form fusion bridges between adjacent particles and continuing the passage of a unidirectional electric current through said mass after initial formation of said bridges;
   superimposing upon said unidirectional current an alternating current having a frequency ranging between substantially 100 cycles/sec. and 10 kc./sec.; and
   selecting the ratio of the power of said alternating current and the power of said unidirectional current in accordance with the desired density of said body.

5. A method of sintering discrete electrically conductive particles into a coherent body, comprising the steps of:
   disposing said particles in a mass between a pair of electrodes;
   applying to said mass a light pressure sufficient to ensure development of a spark discharge between adjacent particles upon application of an electric field between said electrodes;

effecting an impulsive spark discharge through said mass to form fusion bridges between adjacent particles and continuing the passage of a unidirectional electric current through said mass after initial formation of said bridges for a period dependent upon the desired density of said body;

superimposing upon said unidirectional current an alternating current having a frequency ranging between substantially 100 cycles/sec. and 10 kc./sec.; and selecting the frequency of said alternating current in accordance with the desired density of said body.

6. A method of sintering discrete electrically conductive particles into a coherent body, comprising the steps of:

disposing said particles in a mass between a pair of electrodes;

applying to said mass a light pressure sufficient to ensure development of a spark discharge between adjacent particles upon application of an electric field between said electrodes;

effecting an impulsive spark discharge through said mass to form fusion bridges between adjacent particles and continuing the passage of a unidirectional electric current through said mass after initial formation of said bridges for a period dependent upon the desired density of said body;

superimposing upon said unidirectional current an alternating current having a frequency ranging between substantially 100 cycles/sec. and 10 kc./sec.; and selecting the ratio of the power of said alternating current and the power of said unidirectional current in accordance with the desired density of said body.

7. A method of sintering discrete particles of an electrically conductive material into a coherent body, comprising the steps of:

selecting particles of said material of a particle size determined by the desired density of said body;

disposing the selected particles in a mass between a pair of electrodes;

applying to said mass a light pressure sufficient to ensure development of a spark discharge between adjacent particles upon application of an electric field between said electrodes;

effecting an impulsive spark discharge through said mass to form fusion bridges between adjacent particles and continuing the passage of a unidirectional electric current through said mass after initial formation of said bridges for a period dependent upon the desired density of said body;

superimposing upon said unidirectional current an alternating current having a frequency ranging between substantially 100 cycles/sec. and 10 kc./sec.; and selecting the ratio of the power of said alternating current and the power of said unidirectional current in accordance with the desired density of said body.

8. A method of sintering discrete particles of an electrically conductive material into a coherent body, comprising the steps of:

selecting particles of said material of a particle size determined by the desired density of said body;

disposing the selected particles in a mass between a pair of electrodes;

applying to said mass a light pressure sufficient to ensure development of a spark discharge between adjacent particles upon application of an electric field between said electrodes;

effecting an impulsive spark discharge through said mass to form fusion bridges between adjacent particles and continuing the passage of a unidirectional electric current through said mass after initial formation of said bridges for a period dependent upon the desired density of said body;

superimposing upon said unidirectional current an alternating current having a frequency ranging substantially between 100 cycles/sec. and 10 kc/sec.; and selecting the ratio of power of said alternating current and the power of said unidirectional current in accordance with the desired density of said body.

9. A method of sintering discrete electrically conductive particles into a coherent body, comprising the steps of:

disposing said particles in a mass between a pair of electrodes;

applying to said mass a light pressure sufficient to ensure development of a spark discharge between adjacent particles upon application of an electric field between said electrodes;

effecting an impulsive spark discharge through said mass between said electrodes to form fusion bridges between adjacent particles and continuing the passage of a unidirectional electric current through said mass after initial formation of said bridges for a duration sufficient to consolidate said body; superimposing upon said unidirectional current an alternating current having a frequency ranging between substantially 100 cycles/sec. and 10 kc./sec.;

determining the characteristic variation of the density of said body with the parameters of particle size, sintering duration, frequency of alternating current superimposed upon said unidirectional current, and relative powers of said alternating current and said direct current; and selectively setting at least one of said parameters and effecting at least one of the following steps (a) and (b) to establish the density of the sintered body in accordance with the characteristic variation of the modified selectively set variables with density:

(a) varying the frequency of said alternating current in accordance with the desired density of the body, and (b) varying the ratio of the power of said alternating current and the power of said unidirectional current in accordance with the desired density of said body.

10. Apparatus for sintering electrically conductive particles into a coherent body, comprising:

a pair of electrodes adapted to sandwich a mass of said particles between them at a mechanical pressure sufficient to ensure the development of a spark discharge through said mass between said electrodes;

means for applying an essentially unidirectional electric current to said electrodes and for effecting an impulsive spark discharge therebetween;

means for applying an alternating current having a frequency between substantially 100 cycles/sec. and 10 kc./sec. across said electrodes; and proportioning means for selectively adjusting the relative alternating current and unidirectional current powers supplied to said electrodes.

11. Apparatus for sintering electrically conductive particles into a coherent body, comprising:

a pair of electrodes adapted to sandwich a mass of said particles between them at a mechanical pressure sufficient to ensure the development of a spark discharge through said mass between said electrodes;

means for applying an essentially unidirectional electric current to said electrodes and for effecting an impulsive spark discharge therebetween;

variable-frequency means for applying a selected frequency of an alternating current having a frequency between substantially 100 cycles/sec. and 10 kc./sec. across said electrodes; and proportioning means for selectively adjusting the relative alternating current and unidirectional current powers supplied to said electrodes.

12. Apparatus as defined in claim 11, further comprising current-responsive means for connecting said means for applying alternating current to said electrodes in circuit therewith upon the unidirectional current supplied to said electrodes attaining a predetermined level.

13. Apparatus as defined in claim 11, further comprising adjustable timer means for terminating the flow of said unidirectional current to said electrodes after a predetermined sintering period.

14. Apparatus as defined in claim 13 wherein said timer means is operable upon the current supplied to said electrodes attaining a predetermined magnitude.

References Cited by the Examiner
UNITED STATES PATENTS 3,241,956  3/1966  Inoue _____ 219—149 X RICHARD M. WOOD, *Primary Examiner.*

R. F. STAUBLY, *Assistant Examiner.*